US008688639B2

(12) United States Patent
Chou et al.

(10) Patent No.: US 8,688,639 B2
(45) Date of Patent: Apr. 1, 2014

(54) DISTRIBUTED MULTIMEDIA ACCESS SYSTEM AND METHOD

(75) Inventors: Cheng-Fu Chou, Taipei (TW); Yi-Ting Chang, Taipei (TW); Ching-Ju Lin, Taipei (TW); Chih-Cheng Hsu, Taipei (TW)

(73) Assignee: National Taiwan University, Taipei (TW)

( * ) Notice: Subject to any disclaimer, the term of this patent is extended or adjusted under 35 U.S.C. 154(b) by 1211 days.

(21) Appl. No.: 12/265,491

(22) Filed: Nov. 5, 2008

(65) Prior Publication Data
US 2009/0119265 A1    May 7, 2009

(30) Foreign Application Priority Data

Nov. 5, 2007   (TW) .................................. 096141637
Nov. 4, 2008   (TW) .................................. 097142466

(51) Int. Cl.
*G06F 17/30* (2006.01)
(52) U.S. Cl.
USPC ........................... 707/630; 707/636; 709/209
(58) Field of Classification Search
CPC ......... G06F 15/16; G06F 17/00; G06F 17/30; G06F 17/30705; G06F 17/30575; G06F 17/30386; G06F 17/30283; G06F 17/30265; G06F 3/048; G06F 13/00; G06F 15/173; G06F 17/30011; G06F 17/30017; G06F 17/301; G06F 17/30206; G06F 17/30244; G06F 17/3064; G06F 17/3086
USPC ......................................... 707/630, 636, 770
See application file for complete search history.

(56) References Cited

U.S. PATENT DOCUMENTS

| 7,571,251 | B2* | 8/2009 | Bowman ....................... 709/242 |
| 7,881,315 | B2* | 2/2011 | Haveson et al. ............... 370/401 |
| 8,041,942 | B2* | 10/2011 | Narayanan et al. ........... 713/156 |
| 2005/0038856 | A1* | 2/2005 | Krishnasamy et al. ........ 709/206 |
| 2006/0020662 | A1* | 1/2006 | Robinson ....................... 709/203 |
| 2006/0282856 | A1* | 12/2006 | Errico et al. .................... 725/46 |
| 2007/0136370 | A1* | 6/2007 | Frieder et al. .............. 707/104.1 |
| 2008/0195597 | A1* | 8/2008 | Rosenfeld et al. ................ 707/5 |

OTHER PUBLICATIONS

Yang et al. "Performance of Full Text Search in Structured and Unstructured Peer-to-Peer Systems"; IEEE Infocom 2006.*

* cited by examiner

*Primary Examiner* — Debbie Le
(74) *Attorney, Agent, or Firm* — WPAT, P.C.; Anthony King

(57) ABSTRACT

A distributed media access system and method. The method includes making each of a plurality nodes in a P2P network designate at least one nearest neighbors as a first node candidate and perform at least one random walk to obtain a second node candidate according to the peer list; calculating user preferences of the request node and user preferences of the first and second node candidates according to the first and second node candidates and the preference parameters corresponding to the first and second node candidates so as to obtain a plurality of similarity values; selecting the more similar candidate as buddies of user of the node according to the calculated similarity values; and establishing a buddy list according to the buddies of user and storing the buddy list such that the P2P network can quickly find buddies of the node through the buddy list.

17 Claims, 7 Drawing Sheets

DISTRIBUTED MULTIMEDIA ACCESS SYSTEM AND METHOD

BACKGROUND OF THE INVENTION

1. Field of the Invention

The present invention relates generally to distributed multimedia access systems and methods, and more particularly to a social-based distributed multimedia access system and method for P2P multimedia sharing.

2. Description of Related Art

With the advancement of network technology, multimedia sharing in networks has become more and more popular. Multimedia files such as mp3 files, personal films and photos can be accessed from multimedia sharing sites such as Youtube. More and more users are attracted to see films on multimedia sharing sites, which also offers the multimedia sharing sites great opportunities of advertisement. Accordingly, more and more software and network companies enter into the multimedia sharing field.

A P2P network is one of the most popular distributed networks that makes multimedia sharing efficient. Users can query and download special type of multimedia contents according to their preference through P2P networks. However, most of the P2P networks establish overlay networks according to physical network constraints without taking into account of users' preference and network topology is established through distributed hash tables and ID of sharing contents and has no relation with users' preference. As a result, a user must know ID of a media file before he searches through the network. However, users generally only know part of the media content. For example, users that want to download a music file may only know singer of the music or time he heard the music or only know some lyrics instead of ID of the music. Thus, P2P networks must provide a keyword search service such that users can find multimedia files partially corresponding to the keywords.

In addition, in practical social network, people having same preference usually form a social group and share their experience. Similarly, in P2P networks, some users have preference to a special type of multimedia files, which affects their search and download method. Currently, most sharing systems of P2P networks are constructed only according to physical network constraints without taking into account of users' preference. In such circumstances, a user needs to query large number of users to find files of interest, thereby resulting in high search cost and increasing waiting time. Therefore, sharing systems of P2P networks based on social networks are designed. In detail, one objective of the social network based P2P networks is to establish topology having a social relationship as shown in FIG. 1. However, the relationship is now established based on two persons' preferences instead of friendship. If two persons have same type of preference, a tie is established between them. Thus, network nodes having same preference are connected through short path, which make interchange of multimedia more efficient. That is, when a network node searches a preferred object, the node can find the object from neighboring network nodes with great possibility. As shown in FIG. 2, a social relationship based on preference similarity is shown.

However, it is not easy to realize efficient sharing of the multimedia files through the social network based distributed system. It depends on two factors: the first is how to define users' preference and similarity between users; and the second is adjustment of the distributed system. A system can concentrate (collect) all users' information and assess similarity between any two persons so as to establish best overlay structures. But concentrated system cannot afford large number of users and cannot efficiently process change of users' preference and network. Therefore, there is a need to increase sharing efficiency of the above-described social network based system such that each user can quickly find files of interest on the network according to its preference.

SUMMARY OF THE INVENTION

Accordingly, an objective of the present invention is to provide a distributed multimedia access system and method applicable in a P2P network having a plurality of nodes, through which user of a node joining the P2P network can obtain a buddy list such that the user can quickly find buddies having similar preference through the buddy list.

Another objective of the present invention is to provide a distributed multimedia access system and method applicable in a P2P network having a plurality of nodes, through which user of a node joining the P2P network can obtain a buddy list such that the user can quickly find objects of interest from buddies having similar preference.

A further objective of the present invention is to provide a distributed multimedia access system and method applicable in a P2P network having a plurality of nodes, through which user of a node joining the P2P network can obtain a buddy list such that users can dynamically adjust distributed algorithm of connection of overlay network, thereby making the P2P network capable of efficiently processing joining and leaving of users as well as change of users' preference.

Still another objective is to provide a distributed multimedia access system and method applicable in a P2P network having a plurality of nodes, through which user of a node joining the P2P network can obtain a buddy list so as to improve object search efficiency.

In order to attain the above and other objectives, the present invention provides a distributed multimedia access system and method. The distributed multimedia access system is applied in a P2P network having a plurality of nodes, wherein user of each node needs to input preference parameter to the P2P network and obtains a peer list located at part of the nodes of the P2P network, the system comprises: a buddy candidate selection module that lets any one node designate at least one nearest neighbors as a first node candidate and perform at least one random walk to obtain a second node candidate according to the peer list; a similarity calculation module that calculates similarity between user preferences of the request node and user preferences of the first and second node candidates according to the first and second node candidates obtained by the buddy candidate selection module and the preference parameters corresponding to the first and second node candidates so as to obtain a plurality of similarity values; a buddy selection module that selects the more similar first and/or second node candidate as buddies of user of the node according to the calculated similarity values; and a buddy list storage module that establishes a buddy list according to the buddies of user and stores the buddy list such that the P2P network can quickly find buddies of the node through the buddy list.

According to another embodiment, the distributed multimedia access system further comprises a receiving module for receiving multimedia file query condition sent by the node; a search module for sending the query condition to the plurality of candidates so as to search multimedia files that meet the query condition, wherein the plurality of candidates further sends the query condition to other node candidates so as to search multimedia files that meet the query condition until a predefined time is reached; a capturing module for capturing the multimedia files found by the search module; and a transferring module for transferring the multimedia files captured by the capturing module to the node.

The distributed multimedia access method is applied in a P2P network having a plurality of nodes, wherein user of each node needs to input preference parameter to the P2P network and obtains a peer list located at part of the nodes of the P2P network, the method comprises: making any one node designate at least one nearest neighbor as a first node candidate and perform at least one random walk to obtain a second node candidate according to the peer list; calculating similarity between user preferences of the request node and user preferences of the first and second node candidates according to the first and second node candidates obtained by the buddy candidate selection module and the preference parameters corresponding to the first and second node candidates so as to obtain a plurality of similarity values; selecting the more similar first and/or second node candidate as buddies of user of the node according to the calculated similarity values; and establishing a buddy list according to the buddies of user and storing the buddy list such that the P2P network can quickly find buddies of the node through the buddy list.

According to another embodiment, the distributed multimedia access method further comprises: receiving multimedia file query condition sent by the node; sending the query condition to the plurality of candidates so as to search multimedia files that meet the query condition, wherein the plurality of candidates further sends the query condition to other node candidates so as to search multimedia files that meet the query condition until the predefined time is reached; and capturing the multimedia files that meet the query condition and transferring the multimedia files to the node.

Through a random walk mechanism, the distributed multimedia access system and method according to the present invention reduces the number of messages that need to be exchanged at each node, since each query generates only as many messages as the length of the path it traverses. Compared with the flooding method that collects all users' information of the whole P2P network, the number of messages of the present invention does not increase exponentially with the number of outlinks of each traversed node. Thus, the burden of updating the network construction is greatly decreased, and the sharing efficiency of the basic sharing system of Internet is increased. Meanwhile, each user can quickly find required files over Internet.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

Figure 1:
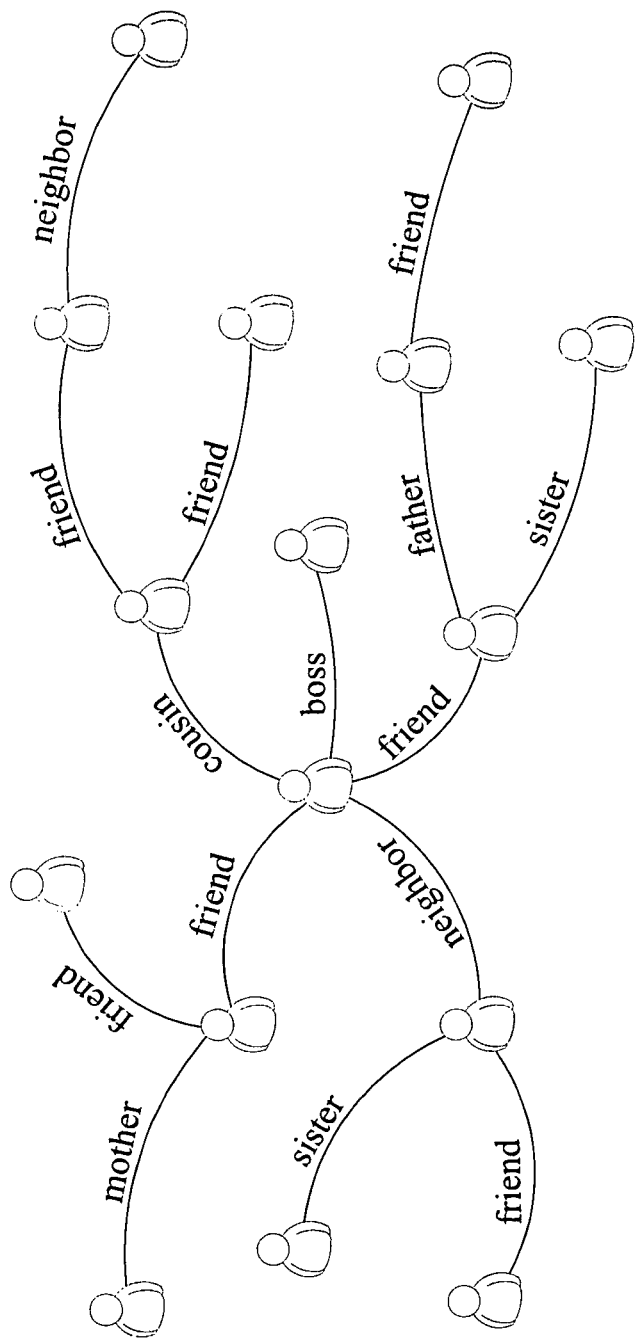
FIG. 1 is a diagram showing social relationship of a social-based P2P network system.
Figure 2:
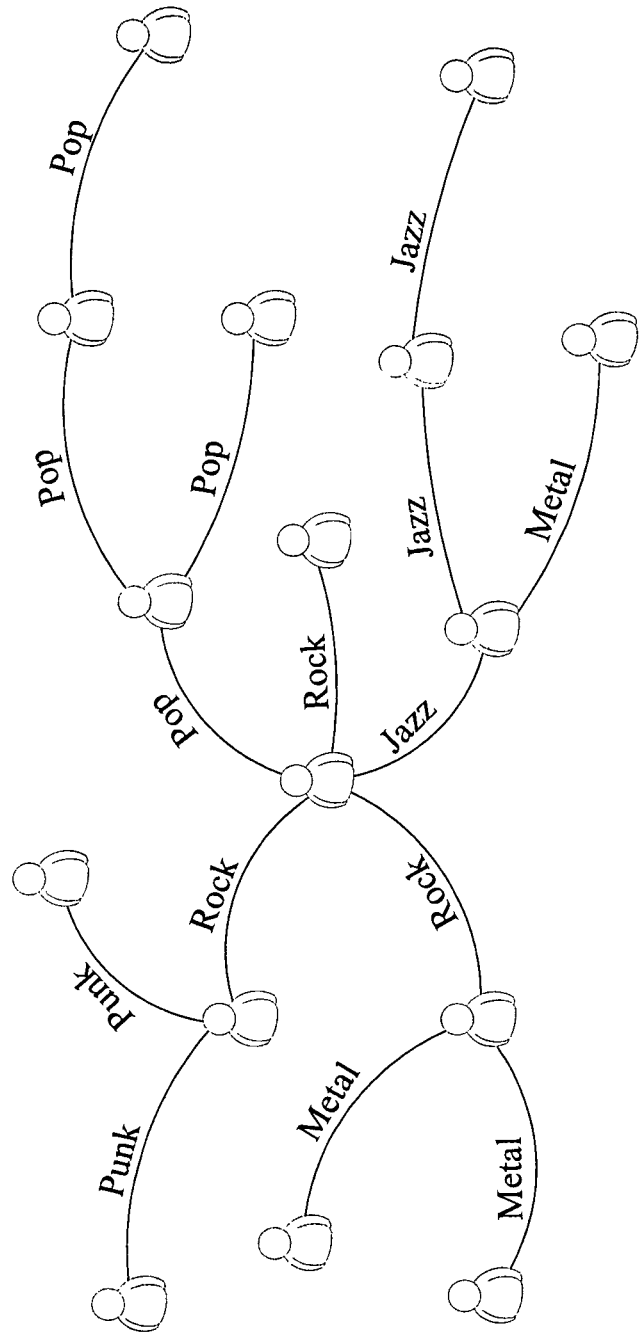
FIG. 2 is a diagram showing social relationship of a preference similarity-based P2P network system.
Figure 3A:
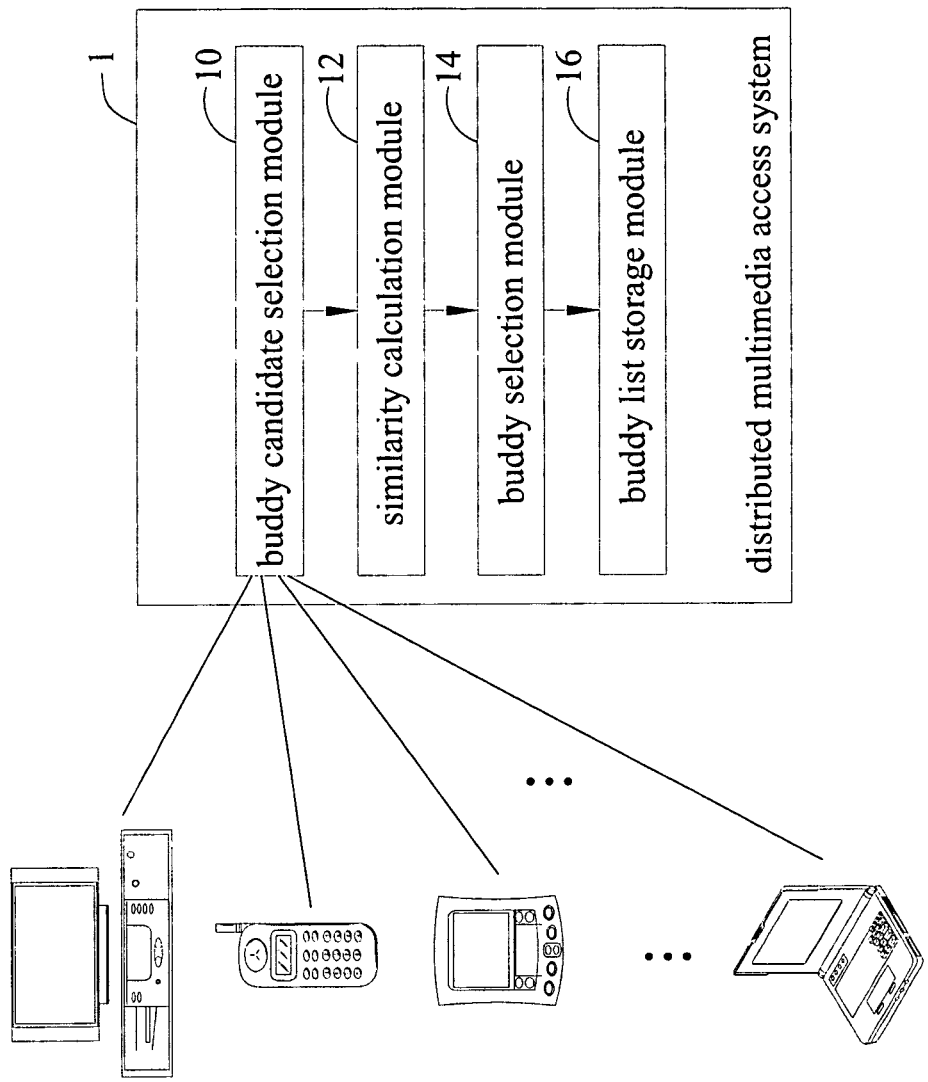
FIG. 3(A) is a block diagram of a distributed multimedia access system according to a preferred embodiment of the present invention.

FIG. 3(A) is a block diagram of a distributed multimedia access system 1 according to a preferred embodiment of the present invention. The distributed multimedia access system 1 according to the present invention is applied in a P2P (peer-to-peer) network having a plurality of nodes, wherein the plurality of nodes refer to electronic devices capable of being connected to the P2P network and can be workstations, personal computers, notebook computers, servers, mobile phones, personal digital assistants and so on. Users of the electronic devices can search buddies having the same preference (that is, users of other electronic devices) through the distributed multimedia access system 1. As shown in FIG. 1, the distributed multimedia access system 1 comprises a buddy candidate selection module 10, a similarity calculation module 12, a buddy selection module 14 and a buddy list storage module 16.

If a node is to join the P2P network so as to locate multimedia files of interest, user of the node needs to input its preference parameter and node IP, thereby generating a joining P2P network event. The event allows user of the node to request part of a peer list from rendezvous points of the P2P network and the rendezvous point sends back a peer list comprising n peers to the user. The above-described preference parameter can be determined through multimedia file content input by the user.

To make the P2P network quickly find other nodes having similar preference, it is assumed that the buddy candidate selection module 10 lets any one node designates [M/2] nearest neighbors as a first node candidate (that is, buddy candidates) and perform [M/2] random walk to obtain [M/2] second node candidates, wherein M represents the number of the first and second node candidates and the random walk is a typical unbiased sampling mechanism, probability of stopping at a visited node is p and probability of randomly selecting a neighboring node and visiting it is 1-p. Through such a random walk mechanism, the number of messages does not increase exponentially with the number of outlinks of each traversed node.

The similarity calculation module 12 calculates similarity between user of the node and the M candidates so as to obtain a plurality of similarity values. Each candidate only stores objects related to preference thereof and characteristic of the candidate can be determined through description of attributes of the objects. An object can have multiple attributes. For example, a music file has a plurality of attributes such as genre, artist, title, language and so on. In the present embodiment, an attribute set is denoted as A, and a is one attribute of A, Ka represents a set of keywords used to describe the attribute a. For example, $K_{genre}$={Jazz; Classic; Rock ...}, an attribute of an object can be tagged by a keyword of $K_{genre}$. In addition, an object can be tagged by multiple keywords describing multiple attributes. For example, a music file may have multiple keywords such as genre="Jazz", artist="Pat Metheny", title="Bright size life". Thus, objects can be categorized based on the tagged keywords. Preferences for different categories of objects can be used to distinguish the characteristics of different peers. In particular, similarity can be calculated through following equations, for example, if preference parameter is determined through attribute of objects input by user of the node, Profile($c_i$) represents multimedia files input by user $c_i$ of the node and is defined as a vector of weights $\vec{w_i}=(w_i k_1, w_i k_2, \ldots, w_i k_n, \ldots)$, the weight $w_i k_n$ represents user $c_i$'s preference for the objects described by the keyword $k_n$, wherein $$w_i k_n = \frac{|O_{i,k_n}|}{|O_i|}$$

wherein $O_i$ is the set of objects held by user $c_i$, $O_{i,k_n}$ is a subset of $O_i$ containing the objects tagged by the keyword $k_n$. We then use the cosine similarity measure to quantify similarity $sim(c_i,c_j)$ between $c_i$ and one of the M candidates $c_j$, the equation is as follows:

$$sim(c_i, c_j) = \cos(\vec{w_i}, \vec{w_j}) = \frac{\vec{w_i} \cdot \vec{w_j}}{\|\vec{w_i}\|_2 \times \|\vec{w_j}\|_2} = \frac{\sum_{k=1}^{K} w_{i,k} w_{j,k}}{\sqrt{\sum_{k=1}^{K} w_{i,k}^2} \sqrt{\sum_{k=1}^{K} w_{j,k}^2}}$$

wherein K is the total number of keywords. If $c_i$ and $c_j$ have similar tastes in certain styles of multimedia content, then $sim(c_i,c_j)$ returns a smaller value.

Then, let the buddy selection module 14 to select d more similar candidates as buddies of user of the node according to the plurality of similarity value calculated by the similarity calculation module 12. In other words, each node maintains a buddy list comprising d most similar peers, i.e. nodes that yield smallest values of $sim(c_i,c_j)$, and an overlay connection is established with the nodes.

The buddy list storage module 16 establishes a buddy list of the d most similar candidates selected by the buddy selection module 14 and stores the buddy list in the distributed multimedia access system 1 of the present invention such that the P2P network can quickly find buddies of the node through the buddy list.

Figure 3B:
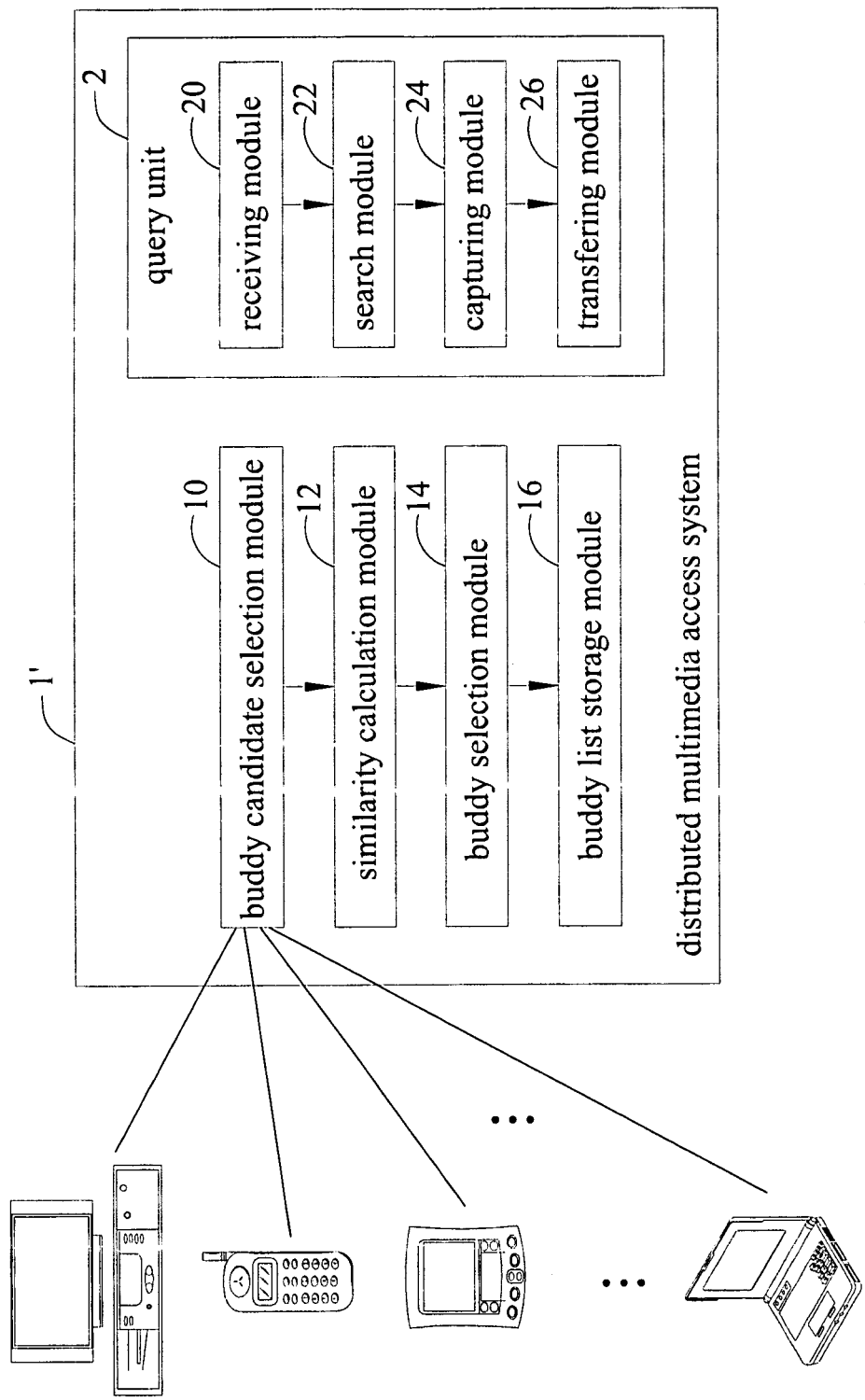
FIG. 3(B) is a block diagram of a distributed multimedia access system according to another embodiment of the present invention.

Referring to FIG. 3(B), a block diagram of a distributed multimedia access system 1' according to another embodiment is shown. The distributed multimedia access system 1' of the present embodiment is similar to the distributed multimedia access system 1 except that a query unit 2 is provided in the present embodiment. The query unit 2 is used for searching multimedia files interested by user of the node, wherein the multimedia files can be such as RM, WMA, MP3, WMV, AVI, MIDI files and so on. The query unit 2 comprises a receiving module 20, a search module 22, a capturing module 24 and a transferring module 26.

The receiving module 20 is used to receive multimedia file query condition sent by the node. If a node wants to search an object and only has partial information about the object, the query condition in the present embodiment can be a keyword or a unique identification code.

The search module 22 sends the query condition to the plurality of candidates so as to search multimedia files that meet the query condition. The plurality of candidates can further send the query condition to other candidates. The search process is performed until a predefined time is reached (or called Time To Live, TTL).

When the search module 22 finds multimedia files that meet the query condition, the capturing module 24 captures the multimedia files and determines whether to establish a multimedia file list according to the number of the multimedia files. Supposed that an object is tagged by a series of keywords, that is, $M=\{k_1, k_2, \ldots, k_i, \ldots\}$, wherein each keyword $k_i \in K_{a_i}$ is used to describe an attribute $a_i \in A$, if a query keyword set is a subset of M, it means that the object meets the query condition.

A transferring module 26 is used to transfer the multimedia files to the node, wherein if the number of the captured multimedia files is large, a multimedia file list can be provided to the node such that the node can select preferred resources from the multimedia file list to download. In other words, the capturing module 24 establishes a multimedia file list when a large number of multimedia files that meet the query condition are found, and the multimedia file list is sent to user of the node for browsing. The user can then send detection message and select preferred resources to download, thereby improving multimedia file download efficiency.

Figure 4:
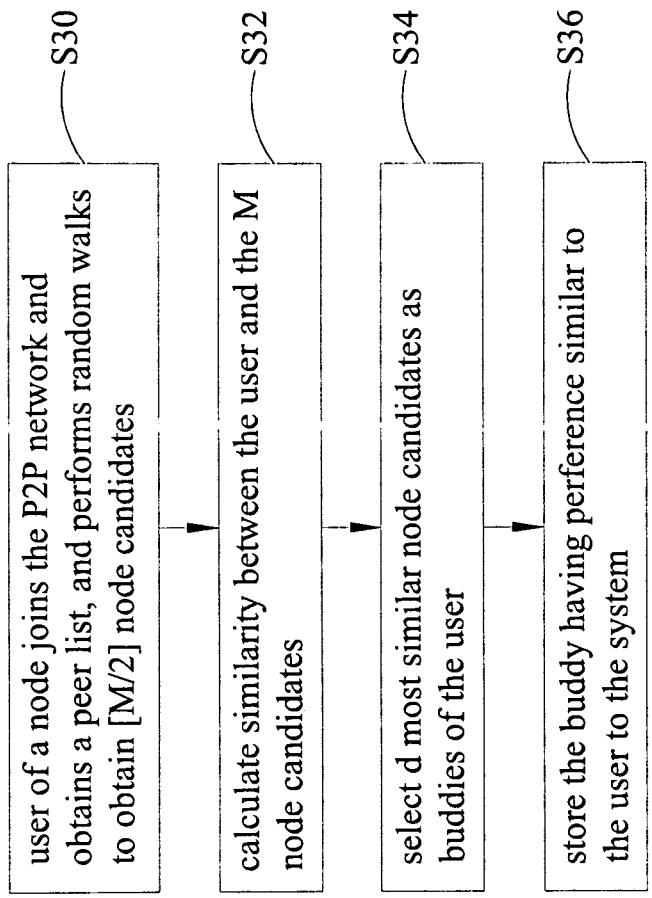
FIG. 4 is a basic operation process diagram of a distributed multimedia access method according to the present invention.

FIG. 4 is a basic operation process diagram of a distributed multimedia access method, which establishes connection relationship between user of a node and its buddies having similar preference on a P2P network. That is, the process allows user of the node to quickly find peers having similar preference. Therein, the plurality of nodes of the P2P network establishes a peer list through sharing system of the P2P network. The process comprises the following steps.

In step S30, user of a node joins the P2P network and obtains a peer list. Then, any one node designates [M/2] nearest neighbors as a first node candidate and performs [M/2] random walks to obtain [M/2] second node candidates, wherein M represents the number of the first and second node candidates (or buddy candidates). Then, the process goes to step S32.

In step S32, similarity between the user and the M candidates is calculated according to their preference so as to obtain a plurality of similarity values. The process goes to step S34.

In step S34, d more similar candidates are selected from the M candidates as buddies of the user according to the calculated similarity values, wherein d more similar candidates are nodes that yield smallest values of similarity. Then, the process goes to step S36.

In step S36, a buddy list of the d most similar candidates is established and stored in sharing system of the P2P network such that the user can quickly find buddies having same preference through the sharing system.

In a preferred embodiment, nodes in different clusters have a certain probability to be designated as the first node candidate, which has an advantage that the request node is more likely to be linked to nodes own other types of objects and thus the path distance when other types of objects are searched is reduced effectively.

In another preferred embodiment, the request node can set a probability β when selecting the first node candidate, allowing nodes in different clusters to have a certain probability to be designated to be the first node candidate. The cluster value C is defined to estimate the similarity of the P2P buddies, and the path P is defined to represent an average path distance when different objects are searched. That a P2P demands a higher buddy similarity represents that buddies own very similar data types, and represents that it is hard to fine different types of data among these buddies. Therefore, the path P has a higher value. In order to compromise the cluster value C with the path P, the probability β is defined between 0.1 and 0.3, to allow the whole P2P cluster to have a better performance.

Figure 5:
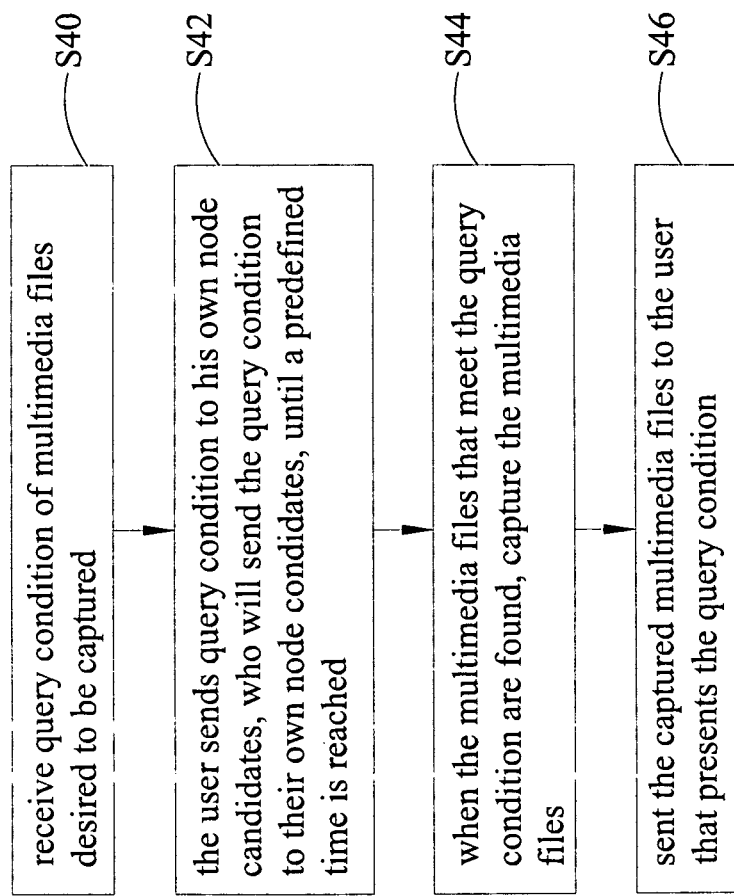
FIG. 5 is an operation process diagram of a distributed multimedia access method according to another embodiment the present invention.

Referring to FIG. 5, a process flow diagram of a distributed multimedia access method according to another embodiment of the present invention is shown, wherein multimedia files are searched through the buddy list established in FIG. 4 such that user of the node can find multimedia files of interest. The process flow comprises the following steps.

In step S40, the sharing system of the P2P network receives multimedia file query condition sent by a node that has joined the P2P network and obtained a peer list, the query condition can comprise multiple keywords or an unique identification code. For example, if the multimedia file is a music file, the query condition can comprise singer, composer, lyric writer, some strings of lyric, multimedia types and so on. Then, the process goes to step S42.

In step S42, the sharing system of the P2P network sends the query condition to the plurality of candidates according to the buddy list so as to search multimedia files that meet the query condition, if the multimedia files cannot be found in the plurality of candidates in the buddy list, the query condition is further sent to a plurality of other candidates until the predefined time (Time to Live, TTL) is reached. Then, the process goes to step S44.

In step S44, when the multimedia files that meet the query condition are found, the multimedia files are captured, that is, when a relay node candidate finds multimedia files that meet the query condition, the multimedia files are sent back to the user that presents the query condition. In addition, whether a multimedia file list is established or not depends on the number of the multimedia files. The established multimedia file list is then sent back to the user. Then, the process goes to step S46.

In step S46, the captured multimedia files or multimedia file list is sent to the user that presents the query condition such that the user can send a detection message according to the multimedia files or multimedia file list, and the user can find preferred resources to download according to the multimedia file list.

In a preferred embodiment, the TTL is determined by an estimation process, which includes the following steps estimating popularity of objects to be searched; multiplying the number of all objects with the popularity to obtain the number of the objects; dividing the number of the all objects by the number of the objects to obtain an average visit number; estimating similarity cluster ratio of neighboring nodes; and integrating the number of nodes of the clusters, the average visit number and the similarity cluster ratio to estimate the TTL.

In another embodiment, let Pn to be the popularity of the objects to be searched. The more popular the objects searched by the users are, the larger Pn becomes. Then, multiply the number (N) of all objects with the popularity (Pn), i.e., Copy (the number of the objects)=N*Pn. Then, divide the number (N) of the all objects by the number (Copy) of the objects to obtain an average visit number $V_{visit}$, i.e., $V_{visit}$=N/Copy. Furthermore, estimate the similar cluster ratio (C) of neighboring nodes. If the node similarity is high, then the similar cluster ratio is large accordingly. Last, multiply the cluster node number d with (1−the similar cluster ratio) to obtain the desired node number d'. Let the time to live $$(TTL) >= \log\left(\frac{d'-1}{d'} N_{visit} + 1\right),$$

to obtain the most suitable TTL.

Figure 6:
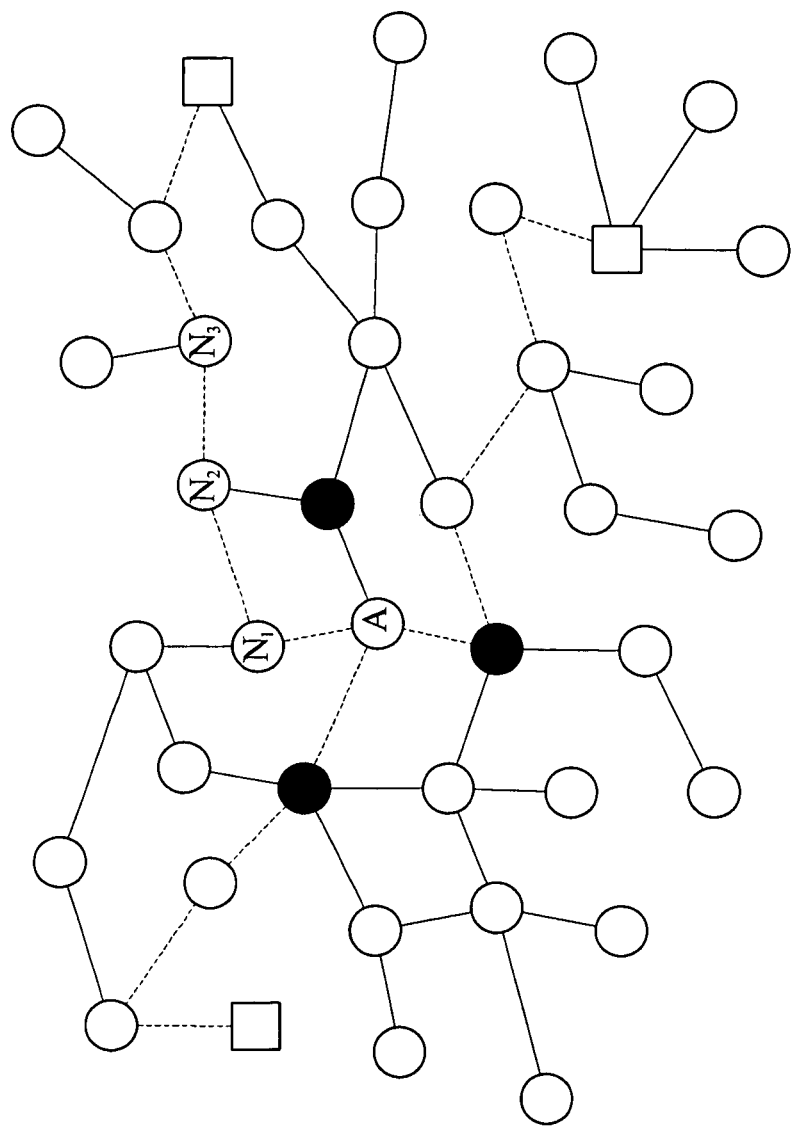
FIG. 6 is a diagram showing a random walk mechanism used by the distributed multimedia access system and method for searching buddies or multimedia files of interest.

FIG. 6 is a diagram showing a random walk mechanism used by the distributed multimedia access system and method for searching buddies or multimedia files of interest. As shown in FIG. 6, a user A in a P2P network is to select 3 of 6 candidates as buddies. In the beginning, the user selects three physical peers in the network as first node candidates (represented by solid circles). Then, random walks are randomly started from three physical peers and extended (dash line regions) and finally stopped at second node candidate nodes of rectangle shapes, those nodes of rectangular shapes also become candidates. The user selects 3 of 6 candidates as buddies.

Therefore, each user has three buddies. To search a file of interest, the user determines TTL first, and then queries its buddies, buddies of buddies and so on until TTL is reached. For example, if TTL is set to 3, the user queries its buddy $N_1$, buddy $N_2$ of $N_1$, and buddy $N_3$ of $N_2$.

The distributed multimedia access system and method according to the present invention can be applied in a P2P network. Through a random walk mechanism, multiple candidates (i.e. peer candidates) having similar interest can be selected and similarity between the user and the candidates are calculated so as to select nodes having high similarity degree as buddies of the user. Meanwhile, the distributed multimedia access system and method according to the present invention can search multimedia files according to keywords on the social network based topology until a predefined time (TTL) is reached. If multimedia files of interest are found, a multimedia file list is established and sent back to the user such that the user can send a detection message and find preferred resource to download, thereby efficiently improving multimedia file download efficiency. Compared with the conventional P2P network that collects all users' information and accordingly has low search efficiency, the distributed multimedia access system and method of the present invention reduces range of queried users, thereby reducing the query cost and saving the query time.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A computer-readable storage medium which stores instructions which, when executed by a computer, enables a distributed multimedia access system applied in a P2P network having a plurality of nodes and a request node, a user located at the request node inputting preference parameters to the P2P network to obtain a peer list that contains some of the plurality of nodes, to:

designate some of the nodes in the peer list that are at shorter distances from the request node than the others of the nodes as first node candidates and performs a random walk process on the first node candidates to search the peer list for second node candidates;

calculate similarity between the preference parameters of the request node and preference parameters of the first and second node candidates to obtain similarity values;

select some of the first and second node candidates that have similarity values smaller than similarity values of the others of the first and second node candidates as buddies for the user located at the request node; and establish and store a buddy list that contains the buddies;

wherein the node candidates store objects related to the preference parameters input by users located at the node candidates;

wherein when the preference parameters are determined through attributes of the objects input by the user located at the request node, the similarity calculation module lets object ($c_i$) represent the objects input by the user $c_i$ located at the request node and be defined as a vector of weights $(\vec{wi})=(w_ik_1, w_ik_2, \ldots, w_ik_n)$, wherein the weight $w_ik_n$ represents the user $c_i$'s preference for the objects and is described by keyword $k_n$, the distributed multimedia access system is further enabled to perform the following calculation:

$$w_ik_n = \frac{|O_{i,k_n}|}{|O_i|}$$

wherein $O_i$ is the set of the objects held by the user $c_i$, $O_{i,kn}$ is a subset of $O_i$ containing the objects tagged by the keyword $k_n$.

2. The computer-readable storage medium of claim 1, wherein the preference parameters of each of the nodes are determined through multimedia file contents input by a user located at the node.

3. The computer-readable storage medium of claim 1, wherein characteristics of the node candidates are determined through attribute description of the objects, and the objects have at least one attribute and are categorized according to tagged keywords.

4. The computer-readable storage medium of claim 3, wherein $\vec{wi}$ $$w_ik_n = \frac{|O_{i,k_n}|}{|O_i|}$$

Cosine similarity measure is used to quantify similarity $sim(c_i,c_j)$ between the user $c_i$ and one of the first and second node candidates $c_j$, the distributed multimedia access system is further enabled to perform the following calculation:

$$sim(c_i, c_j) = \cos(\vec{w_i}, \vec{w_j}) = \frac{\vec{w_i}*\vec{w_j}}{\|\vec{w_i}\|_2 \times \|\vec{w_j}\|_2} = \frac{\sum_{k=1}^{K} w_{i,k} w_{j,k}}{\sqrt{\sum_{k=1}^{K} w_{i,k}^2} \sqrt{\sum_{k=1}^{K} w_{j,k}^2}}$$

wherein K is the total number of keywords, and if $c_i$ and $c_j$ have similar tastes in certain styles of multimedia content, then $sim(c_i,c_j)$ returns a smaller value.

5. The computer-readable storage medium of claim 1, wherein the distributed multimedia access system is further enabled to:
receive a query condition of multimedia files sent by the request node;
send the query condition to the first and second node candidates and searches for multimedia files that meet the query condition, wherein the first and second node candidates further send the query condition to other nodes in the peer list and search for multimedia files that meet the query condition until predefined time is reached;
capture the multimedia files that meet the query condition; and
transfer the multimedia files to the request node.

6. The computer-readable storage medium of claim 5, wherein if a plurality of multimedia files are captured by the capturing module, the distributed multimedia access system is further enabled to establish a multimedia file list and send the multimedia file list to the request node.

7. The computer-readable storage medium of claim 5, wherein the query condition is a keyword or a unique identification code.

8. The computer-readable storage medium of claim 7, wherein the keyword is an attribute or an attribute set describing the multimedia files.

9. A distributed multimedia access method applied in a P2P network having a plurality of nodes and a request node, a user located at the request node inputting preference parameters to the P2P network to obtain a peer list that contains some of the nodes, the method comprising the following steps of:
(1) designating some of the nodes in the peer list that are at shorter distances from the request node than the others of the nodes as first node candidates and performing a random walk process on the first node candidates to search the peer list for second node candidates;
(2) calculating similarity between the preference parameters of the request node and preference parameters of the first and second node candidates to obtain similarity values;
(3) selecting some of the first and second node candidates that have similarity values smaller than similarity values of the others of the first and second node candidates as buddies for the user located at the request node; and
(4) establishing a buddy list that contains the buddies;
wherein the node candidates store objects related to the preference parameters input by users located at the node candidates;
wherein when the preference parameters are determined through attributes of the objects input by the user of the request node, object($c_i$) represents the objects input by the user $c_i$ of the node, which is defined as a vector of weights $(\vec{wi})=(w_ik_1, w_ik_2, \ldots, w_ik_n)$, wherein weight $w_ik_n$ resents the user $c_i$'s reference for the objects described by keyword $k_n$, $w_ik_n$ is calculated through the following equation:

$$w_ik_n = \frac{|O_{i,k_n}|}{|O_i|}$$

wherein $O_i$ is the set of the objects held by the user $c_i$, $O_{i,kn}$ is a subset of $O_i$ containing the objects tagged by the keyword $k_n$.

10. The distributed multimedia access method of claim 9, wherein the preference parameters of each of the nodes are determined through multimedia file content input by a user located at the node.

11. The distributed multimedia access method of claim 9, wherein characteristics of the node candidates are determined through attribute description of the objects, and the objects have at least one attribute and are categorized according to tagged keywords.

12. The distributed multimedia access method of claim 11, wherein $\vec{wi}$ $$w_ik_n = \frac{|O_{i,k_n}|}{|O_i|}$$

Cosine similarity measure is used to quantify similarity $sim(c_i,c_j)$ between the user $c_i$ and one of the first and second node candidates $c_j$, the similarity calculation module performs the following calculation:

$$sim(c_i, c_j) = \cos(\overline{w_i}, \overline{w_j}) = \frac{\overline{w_i} * \overline{w_j}}{\|\overline{w_i}\|_2 \times \|\overline{w_j}\|_2} = \frac{\sum_{k=1}^{K} w_{i,k} w_{j,k}}{\sqrt{\sum_{k=1}^{K} w_{i,k}^2} \sqrt{\sum_{k=1}^{K} w_{j,k}^2}}$$

wherein K is the total number of keywords, and if $c_i$ and $c_j$ have similar tastes in certain styles of multimedia content, then $sim(c_i,c_j)$ returns a smaller value.

13. The distributed multimedia access method of claim 9, further comprising:
receiving a query condition of multimedia files sent by the request node;
sending the query condition to the first and second node candidates and searching for multimedia files that meet the query condition, wherein the first and second node candidates further send the query condition to the others in the peer list and search for multimedia files that meet the query condition until predefined time is reached; and
capturing the multimedia files that meet the query condition and transferring the multimedia files to the request node.

14. The distributed multimedia access method of claim 13, wherein if a plurality of multimedia files are captured, a multimedia file list is established and sent to the request node.

15. The distributed multimedia access method of claim 13, wherein the query condition is a keyword or a unique identification code.

16. The distributed multimedia access method of claim 15, wherein the keyword is an attribute or an attribute set describing the multimedia files.

17. The distributed multimedia access method of claim 13, wherein the predefined time is determined by an estimation process.

* * * * *